UNITED STATES PATENT OFFICE.

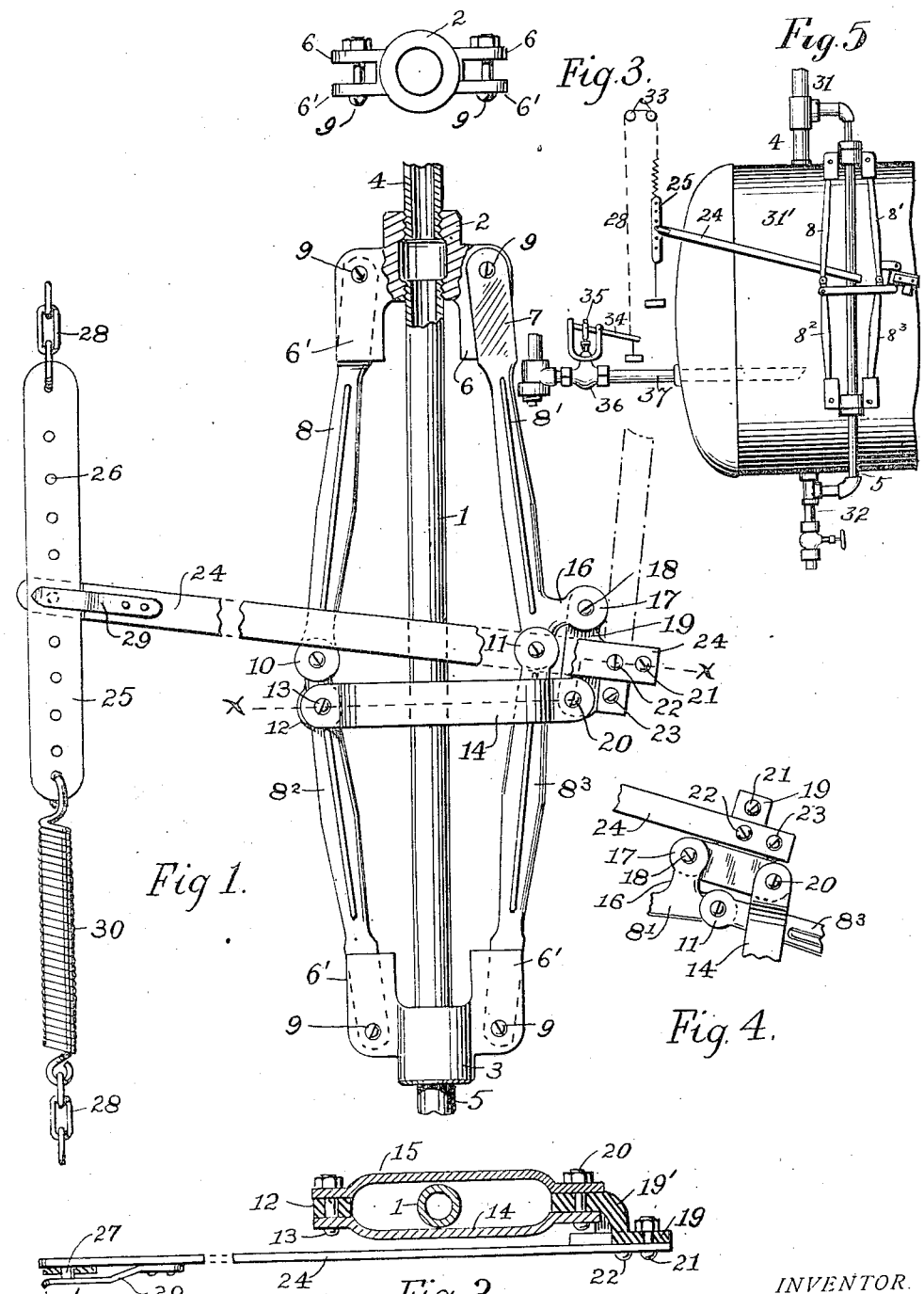

JAMES J. LAWLER, OF MOUNT VERNON, NEW YORK.

THERMOSTATIC REGULATOR.

No. 825,328.  
Specification of Letters Patent.  
Patented July 10, 1906.

Application filed September 15, 1904. Serial No. 224,543.

*To all whom it may concern:*

Be it known that I, JAMES J. LAWLER, a citizen of the United States, residing at Mount Vernon, county of Westchester, State of New York, have invented a new and useful Improvement in Thermostatic Regulators, of which the following is a specification.

My invention relates to thermostatic regulators for hot-water systems and the like, the object being to produce a simple device which is automatically actuated by the circulation of the fluid, air, or steam passing therethrough for the purpose of opening or closing the draft of the heater to which the thermostat is attached and for other purposes.

In the accompanying drawings, which form part of this specification, Figure 1 represents a side elevation of my invention; Fig. 2, a cross-sectional view on line X X of Fig. 1; Fig. 3, a top plan view of the upper and lower fittings. Fig. 4 is a view of the lever connection when the thermostat is positioned horizontally, as will be more fully hereinafter described; and Fig. 5 is a diagrammatical view showing the application of my thermostatic regulator to a steam-boiler.

Similar reference characters indicate similar parts in the several views.

1 is a tube, preferably made of brass or copper of a suitable temper. 2 is an upper fitting, and 3 is a lower fitting, provided with threads at opposite ends to connect said fittings with tube 1 and pipes 4 and 5, being, respectively, the upper and lower heater or boiler connection. These fittings are provided with webs 6 6' at diametrically opposite sides, into which the flat ends 7 of the arms closely fit and articulate. A bolt 9 acts as the pivotal bearing. The arms 8 8' 8² 8³ are cruciform in cross-section, being formed in that shape for the purpose of making them light and rigid. All of the four arms are of exactly the same length, two being connected with each other by a knuckle-joint, as shown at 10 11, and when thus connected each set or pair of arms form an obtuse angle on each side of the tube 1. One arm 8² is provided with a flattened disk 12, perforated for the passage of a screw or bolt 13, which connects two curved straps 14 15 to said arm. Arm 8' has an outwardly-extending lug 16, provided with two parallel disks 17, provided with a bolt 18.

19 is a link which is connected to the lug 16 to form a knuckle-joint and with the two curved straps 14 15, to which it is connected by a bolt 20. This link is provided with a curved extension 19', having a flat side which projects beyond the arm 14, as shown in Fig. 2. On the face of this flat side there are three screws 21 22 23. Two of these screws hold a lever 24 in place, either as shown in Figs. 1 and 2, when the thermostat is in vertical position, or as is shown in Fig. 4, which shows the link mechanism when the thermostat is in horizontal position, as shown by dotted lines in Fig. 1.

On the free end of the lever 24 I show a simple pin-and-spring method of adjusting the lever in a flat metal strip 25, having a series of perforations 26, adapted to engage the pin 27 of the lever. 29 is a flat spring. The flat strip is placed in the "run" or length of a chain 28, which may connect with a door or damper (not shown) or to any other device, such as an indicator or alarm. A coiled spring 30 is preferably fastened to the flat strip, so that in case of any twist or shortening of the chain such an event will not affect the working of the thermostat, as will be more fully hereinafter explained in the operation.

In the construction of my device it is very important that there be no lost motion in any direction, and to prevent side or back-and-forward movement I provide the fittings 2 and 3 with webs, and at all the points where the several parts are connected with each other I use knuckle or hinge joints, so that any motion that is had in the device must be on a plane through the center line—that is to say, the expansion or contraction of the center tube compels the two sets of arms to diverge and converge in the same plane.

By connecting the lower end of the link 19 to the arm 8² by means of the curved straps 14 15 and the upper end of said link to arm 8' a novel compound lever mechanism is had wherein the pivotal and fulcrum points describe a circle when the device is in operation, said points not having any fixed position, as will be explained in the operation.

In Fig. 5 of the drawings I have shown my invention as applied to a boiler for the purpose of regulating the steam-supply to a coil contained in said boiler, and in this view the pipe 4 is connected to a hot-water-supply pipe 31, connected to the boiler 31', while the pipe 5 is connected to a waste-pipe 32. In this application of my invention the chain 28 is passed over the sheaves 33 and has its lower end connected to the weighted lever 34, which is pivotally attached to the valve-stem 35 of a valve 36 on the pipe 37, which conveys the steam-supply to a coil within the boiler.

The apparatus when applied in the manner shown in Fig. 5 of the drawings operates in the manner above described, the operation of course resulting in the movement of valve 36 to regulate the steam passing through the pipe 37.

Such being the construction of my improved device, the operation is as follows: We will consider the thermostat connected to a boiler in a vertical position, as shown in Fig. 1, the pipes 4 and 5 being connected with the boiler in such a manner that the water will circulate through the tube 1 at about the same temperature as the water in the heater or boiler. When the fire is started and the desired temperature is reached, the free end of the lever 24 is attached to the flat metal strip 25 at a suitable point. The chain connects at its upper end with a smoke-pipe or damper-regulator, (not shown,) while the lower end connects with the air-door of the heater. (Also not shown.) When the temperature of the water changes, the brass or copper tube is affected by such changes very quickly. I find a variation of three degrees in the water will actuate the lever. If the water gets hotter, the tube will expand and cause the arms to move toward the center or inward, whereby the lever is actuated by the straps pushing outward against the lever-link 19 at the bottom, the arm 8' simultaneously pulling the upper end of said link inward, thus producing a compound lever movement, which causes the free end of the lever to be lowered, this movement opening the damper and closing the air-door for the purpose of reducing the temperature of the water. If the lever travels farther than is required, it sometimes happens that the links of the lower chain get twisted and the chain shortened, and when the water in the heater gets below a certain temperature the tube contracts and causes the free end of the lever to rise by means of the straps and link, shutting the damper in the smoke-pipe and raising the door; but as the chain may have been shortened by a twist the spring 30 yields when the chain is taut, so that no damage will be done to the thermostat or its delicate adjustment affected in any manner.

If the thermostat is connected up horizontally, then the screws 22 and 23 of the link 19 hold the lever 24 in position, the operation being the same as described. Fig. 4 shows this connection, and when the drawing is turned to the left the dot-and-dash lines show the position of the lever in Fig. 1, the thermostat then being in a horizontal position.

I have described my thermostat as being attached to a heater or boiler; but it is equally effective when steam passes through the tube, or the device may be placed in the hot-water service of a house, where it will quickly and automatically regulate the heating means. I have also found it practical as an alarm or as a means for making an electrical connection, either by itself or in connection with a regulating means, so that a person at a distance can be informed of the position of the lever or temperature of the water. I do not show any electrical connections, because they are so easily applied that any one familiar with the art can adapt a means to suit his particular requirements.

In a device of this kind it is of the utmost importance that there is no lost motion and that the slightest difference in the length of the tube 1 is transmitted to the lever. For this reason I provide all joints with either webs and disks or knuckle-joints to prevent a back-and-forward movement, as explained. With my construction the slightest variation in the angles formed by the upper and lower arms are compounded by means of the strap-and-link movement, the free end of the lever showing considerable movement even when there is no visible movement of the arms. By forming the arms quatrefoil in cross-section or flat, with a rib on each side, they can be cast in iron, being made light and yet rigid, with no liability to spring or bend.

Having thus described my invention, what I claim as new, and desire to secure by Letters Patent, is—

1. A thermostatic regulator comprising an expansible pipe, fittings at each end thereof, arms arranged in pairs at opposite sides of the pipe, each pair of arms having their mean ends pivoted to one another and their extreme ends pivoted to the said fittings, one of said arms being formed with an extension, a pair of straps, each of said straps having its one end pivoted to one of the arms and its other end extending beyond the arms on the opposite side of the said pipe, a link connecting said straps with the said extension of one of the arms, and an actuating means carried by said link.

2. A thermostatic regulator for dampers and the like, comprising an expansible pipe, a fitting arranged at each end thereof, each fitting carrying on its opposite sides a pair of apertured lugs, arms arranged in pairs at opposite sides of the pipe, the arms of each pair having their extreme ends pivoted to the corresponding pair of lugs on each fitting, and having their mean ends pivoted to each other, an extension carried by one of the arms of one pair, a pair of straps pivotally connected to one of the arms of the opposite pair of arms, said straps having their ends extending beyond the other pair of arms, a bracketed link having its ends pivotally connected to said extension and to the projecting end of said straps, an actuating-lever fixed to the said bracketed link and having its free end provided with a flat spring carrying a stud whereby to connect the said lever with a metallic strip, the said strip being provided with a vertically-disposed series of apertures to permit the relative adjustment of the lever thereon, and having one end attached to the principal connection and the other end resiliently attached to a similar connection.

3. A thermostatic regulator, comprising an expansible pipe, a fitting mounted on each end of said pipe, arms arranged in pairs at opposite sides of the pipe, the arms of each pair being pivotally connected together at one end, and having their extreme ends pivotally connected to the fittings, a strap pivotally connected to one arm of one of the pairs of arms, a link pivotally connected at its one end to said strap, and at its other end to one of the arms on the side of the pipe opposite to that where the strap is pivoted, and a lever rigidly connected to said link.

In testimony whereof I have signed my name to this specification, in the presence of two subscribing witnesses, this 9th day of September, 1904.

JAMES J. LAWLER.

Witnesses:
ROBT. W. WARD,
GASTON E. CORDEAU.